US006961507B2

(12) United States Patent
Kubota et al.

(10) Patent No.: US 6,961,507 B2
(45) Date of Patent: *Nov. 1, 2005

(54) OPTICAL FIBER, OPTICAL AMPLIFICATION/OSCILLATION DEVICE, LASER LIGHT GENERATING DEVICE, LASER DISPLAY UNIT, AND COLOR LASER DISPLAY UNIT

(75) Inventors: Shigeo Kubota, Kanagawa (JP); Hisashi Masuda, Tokyo (JP)

(73) Assignee: Sony Corporation, Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 11/081,608

(22) Filed: Mar. 17, 2005

(65) Prior Publication Data

US 2005/0163450 A1    Jul. 28, 2005

Related U.S. Application Data

(63) Continuation of application No. 10/103,878, filed on Mar. 25, 2002, now Pat. No. 6,898,366.

(30) Foreign Application Priority Data

Mar. 26, 2001 (JP) .............................. 2001-088802

(51) Int. Cl.[7] .......................... G02B 6/02; G02B 10/12; G02B 3/30
(52) U.S. Cl. ...................... 385/142; 385/123; 385/144; 359/341.1; 372/6
(58) Field of Search ................................ 385/123–128, 385/141–145; 372/6; 359/341.1, 237

(56) References Cited

U.S. PATENT DOCUMENTS 5,668,659 A * 9/1997 Sakamoto et al. ....... 359/341.5

6,898,366 B2 * 5/2005 Kubota et al. .............. 385/142

FOREIGN PATENT DOCUMENTS

| JP | 63184386 | 7/1988 | |
| JP | 63184386 A * | 7/1988 | ............. H01S 3/17 |
| JP | 08152531 | 6/1996 | |
| JP | 08152531 A * | 6/1996 | ............ G02B 6/00 |

OTHER PUBLICATIONS

A High Gain, High Output Saturation Power Pr3+ -Doped Fluoride Fiber Amplifier Operating at 1.3 μm, Yasutake Ohishi et al, IEEE Photonics Technology Letters, vol. 3, No. 3, Aug. 1991, pp. 715-717.
Optimization of Pr3+ :ZBLAN Fiber Amplifiers, B. Pedersen et al, IEEE Photonics Technology Letters, vol. 4, No. 5, May 1992, pp. 446-448.
Schott Glass Technologies, Inc. Products and Applications, Rare Earth Doped Filter Glass, 1999, 4 pages.
"Erbium-doped filter amplifiers, fundamentals and technology", P.C. Becker et al, Optical Fiber Fabrication, Acaderic Press 1999, pp. 26, 74, 51 and 413.

* cited by examiner

Primary Examiner—Michelle R. Connelly-Cushwa
(74) Attorney, Agent, or Firm—Oblon, Spivak, McClelland, Maier & Neustadt, P.C.

(57) ABSTRACT

Disclosed herein is an optical fiber including a core doped with first metal ions; and a cladding formed so as to surround the core and doped with second metal ions selected so that the absorption coefficient in a transition wavelength band of first transition of the first metal ions is greater than the absorption coefficient in a transition wavelength band of second transition of the first metal ions. The amplification of light due to the first transition is suppressed, and at least the amplification or oscillation of light due to the second transition is effected. Also disclosed are an optical amplification/oscillation device, a laser light generating device, and a laser display unit, and a color laser display unit each employing the optical fiber.

1 Claim, 9 Drawing Sheets

OPTICAL FIBER, OPTICAL AMPLIFICATION/OSCILLATION DEVICE, LASER LIGHT GENERATING DEVICE, LASER DISPLAY UNIT, AND COLOR LASER DISPLAY UNIT

BACKGROUND OF THE INVENTION

The present invention relates to an optical fiber, optical amplification/oscillation device, laser light generating device, laser display unit, and color laser display unit, and more particularly to an optical fiber capable of operating as a fiber laser, and an optical amplification/oscillation device, laser light generating device, laser display unit, and color laser display unit each employing the optical fiber.

There has been proposed a color laser display unit for displaying a color image by the combination of lasers for emitting red laser light, green laser light, and blue laser light.

As the lasers for emitting red laser light and green laser light, the development of semiconductor lasers is proceeding. Further, a continuous-wave laser having an output of 10 W is now available by a solid-state laser for green laser light.

On the other hand, various studies have been made on the laser for emitting blue laser light. For example, a compound semiconductor laser containing nitrides typically such as gallium nitride (GaN) and method employing a nonlinear element for converting infrared laser light in a 920 nm band, for example, into a second harmonic to obtain blue laser light have been considered.

The above method employing a nonlinear element for converting infrared laser light into a second harmonic utilizes a nonlinear phenomenon, so that it is necessary to ensure a sufficient intensity of infrared laser light entering the nonlinear element.

A fiber laser using an optical fiber having a double-cladding structure has been proposed to obtain laser light in a 1050 nm band or in a 1550 nm band.

FIG. 1 is a schematic perspective view of an optical fiber 1 having a double-cladding structure, configuring the above fiber laser.

The optical fiber 1 has a core 10, a first cladding 11 formed so as to surround the core 10, and a second cladding 12 formed so as to surround the first cladding 11.

The core 10 is formed of glass doped with $Er^{3+}$ or $Nd^{3+}$, for example. The following description is applied to the case where the core 10 is formed of glass doped with $Nd^{3+}$.

When pump light PL having a wavelength of 810 nm emitted from a semiconductor laser, for example, is coupled into the first cladding 11, laser light in a 1050 nm band, for example, is generated due to $^4F_{3/2} \rightarrow {}^4I_{11/2}$ transition as an example of the transitions of an energy state of $Nd^{3+}$ in the glass.

On the other hand, signal laser light SL as light to be amplified, having a wavelength of 1050 nm is coupled into the core 10 simultaneously with the pump light PL, so that the signal laser light SL having the wavelength of 1050 nm can be amplified in the optical fiber 1 to thereby obtain high-intensity laser light in the 1050 nm band.

However, a blue light source as in a color laser display unit employs light having a 920 nm band so as to obtain light having a 460 nm band as a blue region after converting the light in the 920 nm band into a second harmonic. Accordingly, the light in the 1050 nm band is not required, and it is desirable to suppress the oscillation in the 1050 nm band. However, in the optical fiber whose core is doped with $Nd^{3+}$ as mentioned above, the oscillation in the 1050 nm band is much intensive than the oscillation in the 920 nm band, and it is therefore very difficult to suppress the oscillation in the 1050 nm band and simultaneously effect the oscillation and amplification in the 920 nm band.

In the optical fiber capable of operating as a fiber laser in the case that there are a plurality of transition wavelength bands each allowing the oscillation of light, it is unknown that the oscillation in one of the transition wavelength bands is suppressed and the oscillation and amplification in another transition wavelength band are effected.

SUMMARY OF THE INVENTION

It is accordingly an object of the present invention to provide an optical fiber capable of operating as a fiber laser in the case that there are a plurality of transition wavelength bands each allowing the oscillation of light which can suppress the oscillation in one of the transition wavelength bands and can effect the oscillation and amplification in another transition wavelength band.

It is another object of the present invention to provide an optical amplification/oscillation device using the optical fiber.

It is a further object of the present invention to provide a laser light generating device using the optical fiber.

It is a still further object of the present invention to provide a laser display unit using the optical fiber.

It is a still further object of the present invention to provide a color laser display unit using the optical fiber.

In accordance with a first aspect of the present invention, there is provided an optical fiber including a core doped with first metal ions; and a cladding formed so as to surround the core and doped with second metal ions selected so that the absorption coefficient in a transition wavelength band of first transition of the first metal ions is greater than the absorption coefficient in a transition wavelength band of second transition of the first metal ions; the amplification of light due to the first transition being suppressed; at least the amplification or oscillation of light due to the second transition being effected.

Preferably, the absorption coefficient in the transition wavelength band of the first transition of the first metal ions is greater than the absorption coefficient in the transition wavelength band of the second transition of the first metal ions by five times or more.

Preferably, the first metal ions include $Nd^{3+}$.

More preferably, the first transition includes $^4F_{3/2} \rightarrow {}^4I_{11/2}$ transition, and the second transition includes $^4F_{3/2} \rightarrow {}^4I_{9/2}$ transition.

More preferably, the transition wavelength band of the first transition includes 1050±20 nm, and the transition wavelength band of the second transition includes 920±20 nm.

Preferably, the V factor of the optical fiber is in the range of 0.5<V<2.5.

Preferably, the optical fiber is a polarization maintaining fiber.

Preferably, the core is formed of glass doped with the first metal ions.

More preferably, the core is formed of fluoride glass doped with the first metal ions, especially, zirconium containing fluoride glass doped with the first metal ions.

Preferably, the second metal ions include rare earth ions.

More preferably, the second metal ions include $Pr^{3+}$ and the concentration of the $Pr^{3+}$ in the cladding is in the range of 1 wt % to 40 wt %.

More preferably, the second metal ions include $Sm^{2+}$.

Preferably, the optical fiber further includes a second cladding formed so as to surround the cladding.

The optical fiber according to the present invention can be configured as a fiber laser. In the case that there are a plurality of transition wavelength bands each allowing the oscillation of light, due to the first metal ions contained in the core, the cladding is doped with the second metal ions selected so that the absorption coefficient in the transition wavelength band of the first transition of the first metal ions is greater than the absorption coefficient in the transition wavelength band of the second transition of the first metal ions by five times or more, for example. Accordingly, light in the transition wavelength band of the first transition can be absorbed in the cladding to thereby suppress the oscillation in the transition wavelength band of the first transition, whereas light in the transition wavelength band of the second transition can be oscillated and amplified.

In the case that the core is formed of $Nd^{3+}$ doped fluoride glass, for example, $^4F_{3/2} \rightarrow ^4I_{11/2}$ transition (1050 ±20 nm) and $^4F_{3/2}$ $^4I_{9/2}$ transition (920±20 nm) each allowing the oscillation of light are present. By doping the cladding with a predetermined concentration of rare earth ions such as $Pr^{3+}$ or $Sm^{2+}$ in this case, the oscillation due to the $^4F_{3/2} \rightarrow ^4I_{11/2}$ transition (1050±20 nm) can be suppressed, and the oscillation due to the $^4F_{3/2} \rightarrow ^4I_{9/2}$ transition (920±20 nm) can be amplified.

In particular, by selecting the V factor of the optical fiber to about 0.5 to about 2.5, the proportion of propagation of light in the wavelength band of 1050±20 nm in the cladding to propagation in the core can be effectively made higher than the proportion of propagation of light in the wavelength band of 920±20 nm in the cladding to propagation in the core. Accordingly, the absorption of the light in the wavelength band of 1050±20 nm in the cladding can be efficiently performed to thereby suppress the oscillation of the light in the wavelength band of 1050±20 nm.

In accordance with a second aspect of the present invention, there is provided an optical amplification/oscillation device including an optical fiber having a core doped with first metal ions, and a cladding formed so as to surround the core and doped with second metal ions selected so that the absorption coefficient in a transition wavelength band of first transition of the first metal ions is greater than the absorption coefficient in a transition wavelength band of second transition of the first metal ions; a first light source for emitting light to be amplified in the transition wavelength band of the second transition; a second light source for emitting pump light; and optical means for coupling the light to be amplified and the pump light into the optical fiber; the amplification of light due to the first transition being suppressed in the optical fiber; the amplification of the light to be amplified or the oscillation of light due to the second transition being effected in the optical fiber.

Preferably, the second light source includes a semiconductor laser.

Preferably, the wavelength of the pump light includes 800±20 nm in the case that the second metal ions are not $Pr^{3+}$, whereas the wavelength of the pump light includes 845±10 nm or 775±10 nm in the case that the second metal ions are $Pr^{3+}$.

The optical amplification/oscillation device according to the present invention can perform the oscillation and amplification of light in the wavelength band of 920±20 nm, for example, by using the optical fiber of the present invention which in the case that there are a plurality of transition wavelength bands each allowing the oscillation of light, can suppress the oscillation in the transition wavelength band of the first transition and can perform the oscillation and amplification in the transition wavelength band of the second transition.

In accordance with a third aspect of the present invention, there is provided a laser light generating device including an optical fiber having a core doped with first metal ions, and a cladding formed so as to surround the core and doped with second metal ions selected so that the absorption coefficient in a transition wavelength band of first transition of the first metal ions is greater than the absorption coefficient in a transition wavelength band of second transition of the first metal ions; a first light source for emitting light to be amplified in the transition wavelength band of the second transition; a second light source for emitting pump light; a nonlinear element for converting incident light into a second harmonic; and optical means for coupling the light to be amplified and the pump light into the optical fiber and coupling emergent light from the optical fiber into the nonlinear element; the amplification of light due to the first transition being suppressed in the optical fiber; the amplification of the light to be amplified or the oscillation of light due to the second transition being effected in the optical fiber; the emergent light from the optical fiber being converted into second-harmonic laser light by the nonlinear element.

The laser light generating device according to the present invention can perform the oscillation and amplification of light in the wavelength band of 920±20 nm, for example, by using the optical fiber of the present invention which in the case that there are a plurality of transition wavelength bands each allowing the oscillation of light, can suppress the oscillation in the transition wavelength band of the first transition and can perform the oscillation and amplification in the transition wavelength band of the second transition. Furthermore, the emergent light from the optical fiber is converted into second-harmonic laser light in the wavelength band of 460±10 nm by the nonlinear element, and this laser light is generated from this device.

In accordance with a fourth aspect of the present invention, there is provided a laser display unit including a laser light generating device; a spatial modulator for spatially modulating laser light generated from the laser light generating device; a lens for projecting the laser light spatially modulated by the spatial modulator; and a screen for receiving the laser light projected by the lens to form an image; the laser light generating device including an optical fiber having a core doped with first metal ions, and a cladding formed so as to surround the core and doped with second metal ions selected so that the absorption coefficient in a transition wavelength band of first transition of the first metal ions is greater than the absorption coefficient in a transition wavelength band of second transition of the first metal ions; a first light source for emitting light to be amplified in the transition wavelength band of the second transition; a second light source for emitting pump light; a nonlinear element for converting incident light into a second harmonic; and optical means for coupling the light to be amplified and the pump light into the optical fiber and coupling emergent light from the optical fiber into the nonlinear element; the amplification of light due to the first transition being suppressed in the optical fiber; the amplification of the light to be amplified or the oscillation of light due to the second transition being effected in the optical fiber; the emergent light from the optical fiber being converted into second-harmonic laser light by the nonlinear element.

Preferably, the wavelength of the second-harmonic laser light includes 460±10 nm.

The laser display unit according to the present invention can perform the oscillation and amplification of light in the wavelength band of 920±20 nm, for example, by using the optical fiber of the present invention which in the case that there are a plurality of transition wavelength bands each allowing the oscillation of light, can suppress the oscillation in the transition wavelength band of the first transition and can perform the oscillation and amplification in the transition wavelength band of the second transition. Furthermore, the emergent light from the optical fiber is converted into second-harmonic laser light in the wavelength band of 460±10 nm by the nonlinear element, and this laser light is projected onto the screen by the lens.

In accordance with a fifth aspect of the present invention, there is provided a color laser display unit including a blue laser light generating device; a green laser light generating device; a red laser light generating device; a spatial modulator for spatially modulating blue laser light generated from the blue laser generating device, green laser light generated from the green laser light generating device, and red laser light generated from the red laser light generating device; a lens for projecting the blue laser light, the green laser light, and the red laser light spatially modulated by the spatial modulator; and a screen for receiving the blue laser light, the green laser light, and the red laser light projected by the lens to form a color image; the blue laser light generating device including an optical fiber having a core doped with first metal ions, and a cladding formed so as to surround the core and doped with second metal ions selected so that the absorption coefficient in a transition wavelength band of first transition of the first metal ions is greater than the absorption coefficient in a transition wavelength band of second transition of the first metal ions; a first light source for emitting light to be amplified in the transition wavelength band of the second transition; a second light source for emitting pump light; a nonlinear element for converting incident light into a second harmonic; and optical means for coupling the light to be amplified and the pump light into the optical fiber and coupling emergent light from the optical fiber into the nonlinear element; the amplification of light due to the first transition being suppressed in the optical fiber; the amplification of the light to be amplified or the oscillation of light due to the second transition being effected in the optical fiber; the emergent light from the optical fiber being converted into second-harmonic laser light by the nonlinear element.

The color laser display unit according to the present invention can perform the oscillation and amplification of light in the wavelength band of 920±20 nm, for example, by using the optical fiber of the present invention which in the case that there are a plurality of transition wavelength bands each allowing the oscillation of light, can suppress the oscillation in the transition wavelength band of the first transition and can perform the oscillation and amplification in the transition wavelength band of the second transition. Furthermore, the emergent light from the optical fiber is converted into second-harmonic laser light in the wavelength band of 460±10 nm by the nonlinear element, and this blue laser light is projected onto the screen by the lens together with the green laser light and the red laser light.

Thus, the optical fiber according to the present invention can be configured as a fiber laser, and in the case that there are a plurality of transition wavelength bands each allowing the oscillation of light, can suppress the oscillation in one of the transition wavelength bands and can effect the oscillation and amplification in another transition wavelength band. By using this optical fiber, it is possible to configure the optical amplification/oscillation device, the laser light generating device, the laser display unit, and the color laser display unit according to the present invention.

Other objects and features of the invention will be more fully understood from the following detailed description and appended claims when taken with the accompanying drawings.

DETAILED DESCRIPTION OF THE PREFERRED EMBODIMENTS

Some preferred embodiments of the present invention will now be described in detail with reference to the drawings.

First Preferred Embodiment

Figure 1:
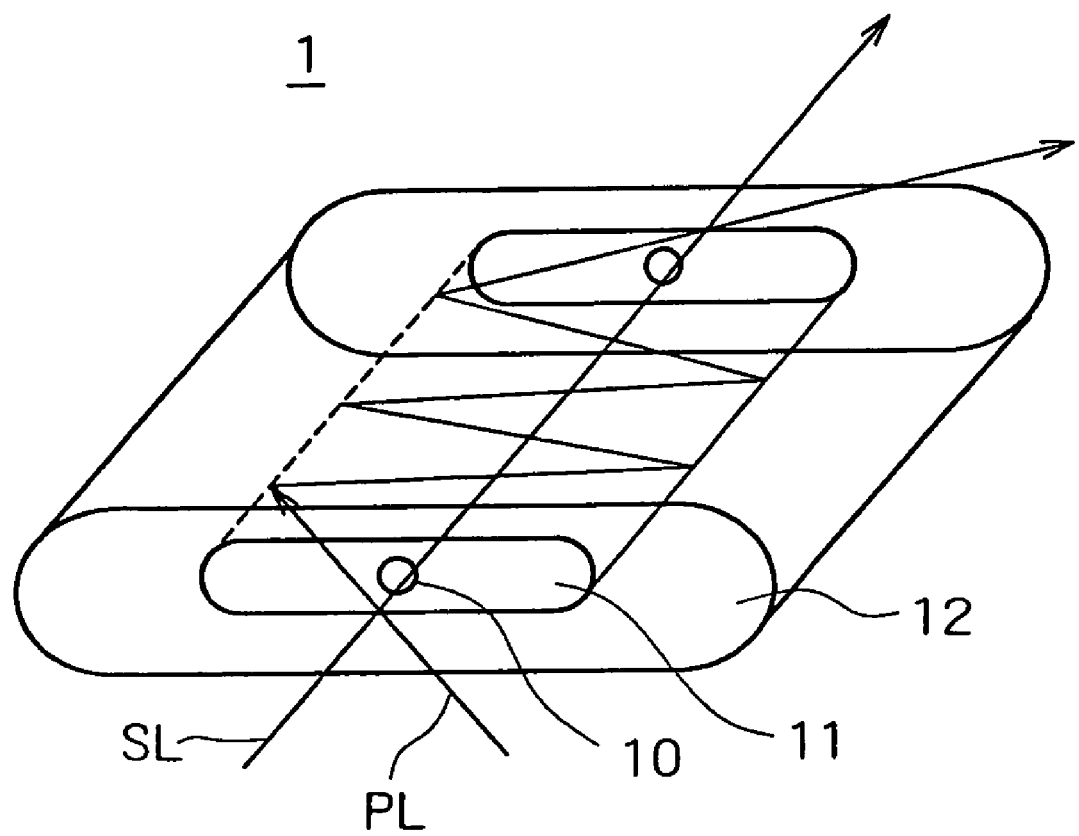
FIG. 1 is a schematic perspective view of an optical fiber as a fiber laser in the related art.
Figure 2:
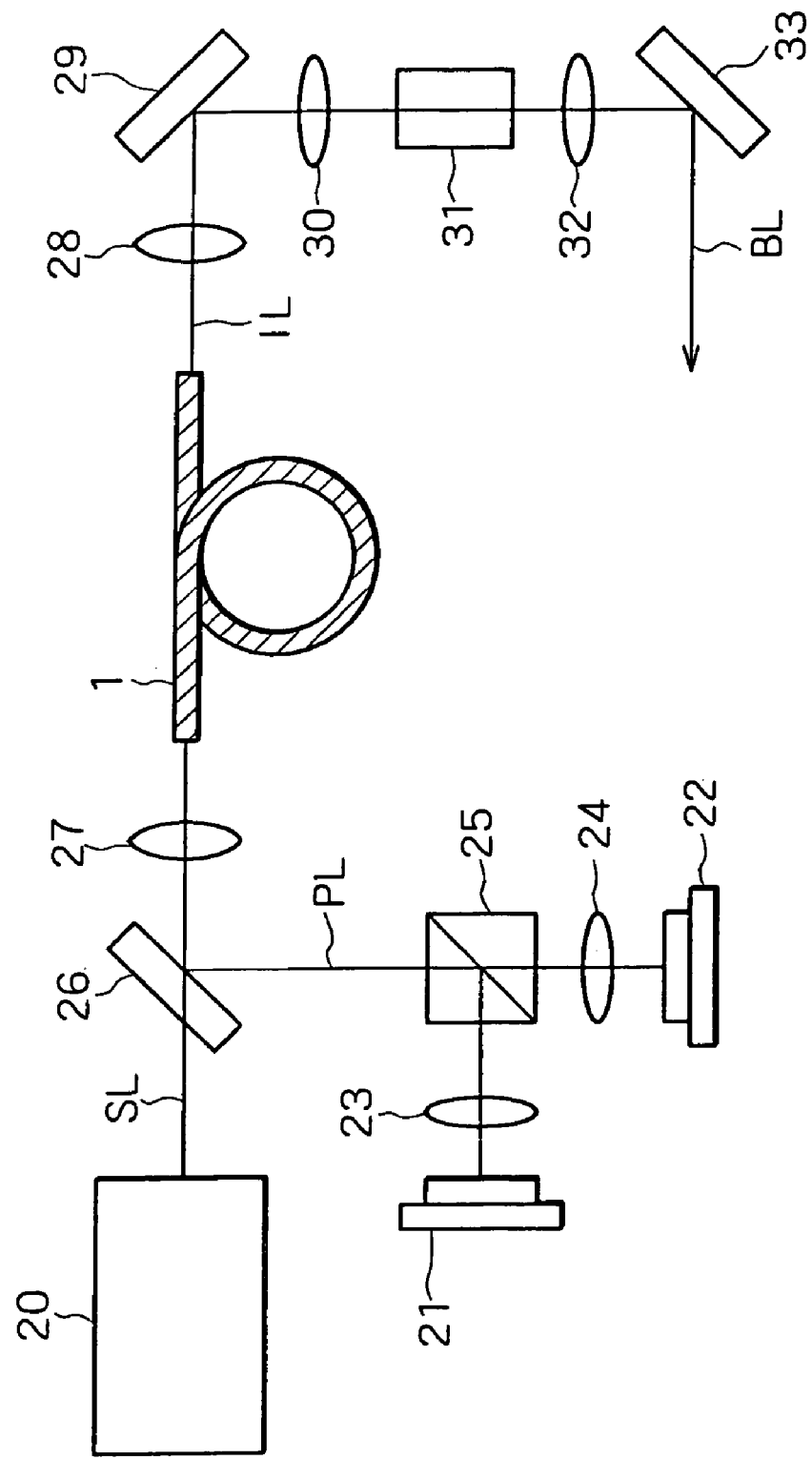
FIG. 2 is a schematic diagram of a laser light generating device according to a first preferred embodiment of the present invention.

FIG. 2 is a schematic diagram showing the configuration of a laser light generating device for preparing high-output infrared laser light having a 920 nm band and converting the infrared laser light into a second harmonic by a nonlinear element to generate blue laser light having a 460 nm band.

In the laser light generating device according to this preferred embodiment, an optical fiber 1 referred to as a fiber laser having a double-cladding structure to be hereinafter described is used to prepare the high-output infrared laser light having a 920 nm band.

In relation to the optical fiber 1, there are arranged at predetermined positions a master laser source 20, pump sources 21 and 22, condenser lenses 23 and 24, a multiplexer element 25, a multiplexer mirror 26, condenser lenses 27 and 28, a demultiplexer mirror 29, a condenser lens 30, a nonlinear element 31 for second-harmonic generation, a condenser lens 32, and a demultiplexer mirror 33.

The master laser source 20 is provided by a semiconductor laser or a solid-state laser, for example. Signal laser light SL having a wavelength of 920±10 nm as light to be amplified is emitted from the master laser source 20 with an output of several to 100 mW, and is coupled into the optical fiber 1 by the multiplexer mirror 26 and the condenser lens 27.

On the other hand, pump light PL having an 810 nm band and a wavelength band of 845±10 nm or 775±10 nm is emitted from the pump sources 21 and 22 with an output of tens of mW, and is coupled into the optical fiber 1 through the respective condenser lens 23 or 24, the multiplexer element 25 and the multiplexer mirror 26.

In the optical fiber 1, the oscillation of light having a 1050 nm band is suppressed, and the light having a 920 nm band is amplified to be emerged as high-intensity infrared laser light IL.

The infrared laser light IL emerged from the optical fiber 1 is separated from the pump light by the demultiplexer mirror 29 as required, and is coupled into the nonlinear element 31 by the condenser lens 30.

In the nonlinear element 31, the infrared laser light IL having a 920 nm band is converted into a second harmonic (460 nm band) by a nonlinear phenomenon to obtain blue laser light BL.

The blue laser light BL emerged from the nonlinear element 31 is extracted through the condenser lens 32 and the demultiplexer mirror 33 for separating the second harmonic (460 nm band) from the fundamental wave (920 nm band).

Figure 3A:
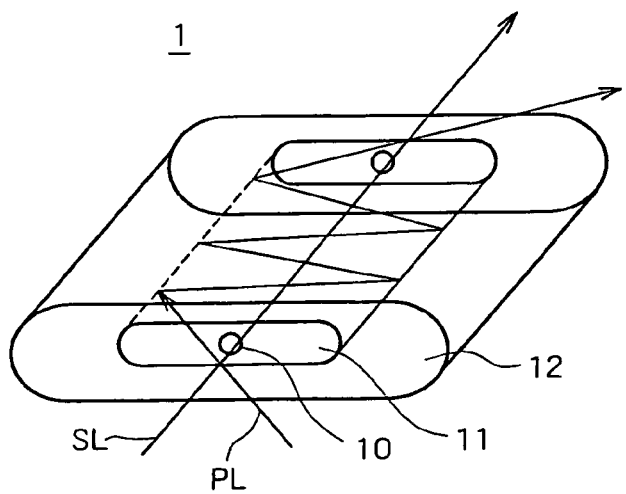
FIG. 3A is a schematic perspective view of an optical fiber used in the laser light generating device shown in FIG. 2.

FIG. 3A is a schematic perspective view of the optical fiber 1 having a double-cladding structure, configuring the above-mentioned fiber laser.

The optical fiber 1 has a core 10, a first cladding 11 formed so as to surround the core 10, and a second cladding 12 formed so as to surround the first cladding 11.

Figure 3B:
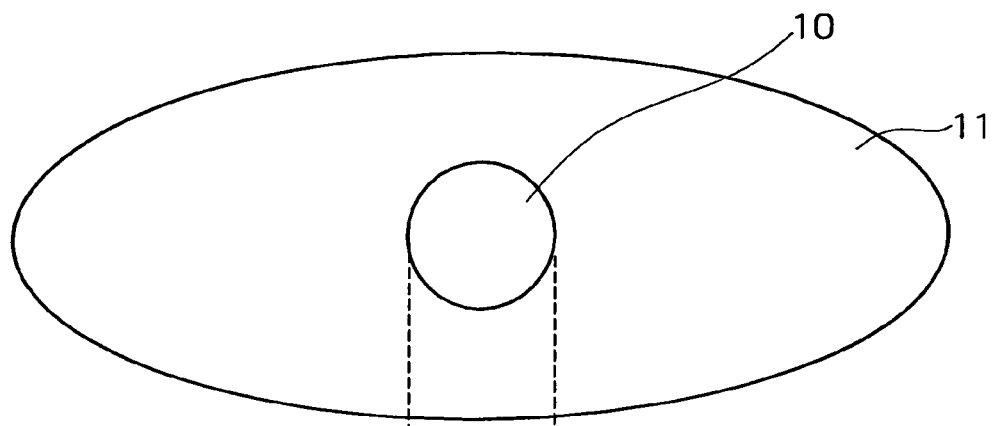
FIG. 3B is a schematic sectional view of a core and a first cladding forming the optical fiber shown in FIG. 3A.

FIG. 3B is a schematic sectional view of the core 10 and the first cladding 11.

The core 10 has a substantially circular cross section, and the first cladding 11 has a substantially elliptical cross section. With this configuration, the optical fiber 1 functions as a polarization maintaining fiber increased in birefringence by giving asymmetry. The polarization maintaining fiber can maintain the polarization of light during propagation, so that the efficiency of the above-mentioned nonlinear optical phenomenon can be improved.

The core 10 is formed of glass such as fluoride glass or zirconium containing fluoride glass (ZBLAN, a tradename) doped with $Nd^{3+}$ at a concentration of 0.01 to 0.1 atomic %, for example.

The first cladding 11 is formed of glass doped with metal ions at a predetermined concentration, in which the metal ions are selected so that the absorption coefficient in the 1050 nm band due to $^4F_{3/2} \to {}^4I_{11/2}$ transition as the first transition of the energy state of $Nd^{3+}$ contained in the core 10 is greater than the absorption coefficient in the 920 nm band due to $^4F_{3/2} \to {}^4I_{9/2}$ transition as the second transition of the energy state of $Nd^{3+}$ contained in the core 10.

More specifically, the absorption coefficient in the 1050 nm band is greater than the absorption coefficient in the 920 nm band preferably by five times or more, more preferably by ten times or more.

As the metal ions, rare earth ions may be used. More specifically, 1 to 40 wt % (typically, 15 wt %) of $Pr^{3+}$ is contained in the first cladding. Alternatively, a low concentration of $Sm^{2+}$ may be used.

When the pump light PL emitted from a semiconductor laser or the like enters the first cladding 11 has shown in FIG. 3A, an excited state ($^4F_{3/2}$) of $Nd^{3+}$ in the glass forming the core 10 is generated. From this excited state, $^4F_{3/2} \to {}^4I_{11/2}$ transition (1050 nm band) and $^4F_{3/2} \to {}^4I_{9/2}$ transition (920 nm band) are generated to generate light corresponding to each transition energy.

At this time, the signal laser light SL as the light to be amplified having a wavelength of 920 nm corresponding to the $^4F_{3/2} \to {}^4I_{9/2}$ transition is coupled into the core 10 simultaneously with the pump light PL, thereby amplifying the signal laser light SL having the wavelength of 920 nm in the optical fiber 1 to obtain high-intensity laser light having a 920 nm band.

On the other hand, the light propagating in the optical fiber 1 is distributed not only in the core 10, but also in the first cladding 11. Further, the first cladding 11 contains metal ions such as $Pr^{3+}$ or $Sm^{2+}$ in which the absorption coefficient in the 1050 nm band is greater than the absorption coefficient in the 920 nm band. Accordingly, owing to the absorption by the above metal ions, the loss of the light in the 1050 nm band can be set greater than the gain in this band, thereby suppressing the oscillation of the laser light in the 1050 nm band.

The absorption coefficient of the metal ions in the first cladding 11 in the 1050 nm band is greater than the absorption efficiency of the metal ions in the first cladding 11 in the 920 nm band preferably by five times or more, more preferably by ten times or more, whereby the oscillation of the laser light in the 1050 nm band can be efficiently suppressed.

By increasing the proportion of distribution of the light in the 1050 nm band in the first cladding 11, the loss of the light in the 1050 nm band in the first cladding 11 can be made greater to thereby more suppress the oscillation of the laser light in the 1050 nm band.

Increasing the proportion of distribution of the light in the 1050 nm band in the first cladding 11 may be attained by setting the V factor of the optical fiber 1 in a predetermined range, thereby enhancing the suppression of the oscillation of the laser light in the 1050 nm band. The V factor of the optical fiber 1 is determined by the radius of the core 10, the wavelength of the laser light, and the refractive indices of the core 10 and the first cladding 11. More specifically, the V factor is set to about 0.5 to about 2.5, especially to about 1.2. In this case, the proportion of distribution of the light in the 1050 nm band in the first cladding 11 to distribution of the light in the 920 nm band in the first cladding 11 can be most increased.

As the wavelength of the pump light PL, an 810 nm band is usually employed for pumping of a $Nd^{3+}$-doped fiber laser. However, $Pr^{3+}$ has absorption in this region, so that when the first cladding 11 contains $Pr^{3+}$, a wavelength band of 845±10 nm or 775±10 nm is employed as the wavelength of the pump light PL. In the case of using $Sm^{2+}$, an 810 nm band may be employed as the wavelength of the pump light PL.

In the laser light generating device according to this preferred embodiment, the oscillation in the first wavelength band (1050 nm band) is suppressed, and the gain in the second wavelength band (920 nm band) is obtained to obtain high-intensity laser oscillation in the 920 nm band. Then, the laser light in the 920 nm band is converted into a second harmonic by the nonlinear element to thereby generate blue laser light in the 460 nm band.

EXAMPLE

By using the optical fiber 1 with the first cladding 11 doped with $Pr^{3+}$, a simulation was performed to calculate the gain of laser light in the 1050 nm band and the gain of laser light in the 920 nm band.

Figure 4:
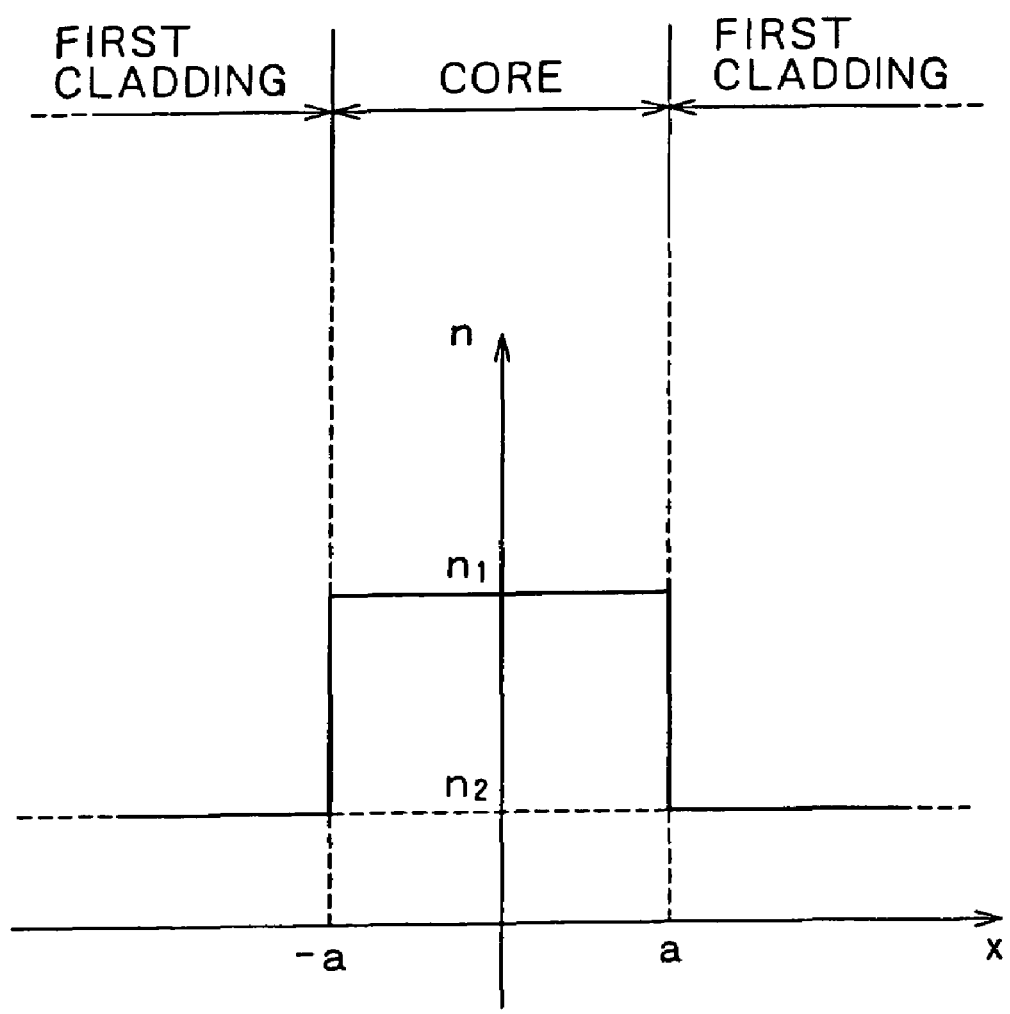
FIG. 4 is a diagram showing a refractive index profile of the optical fiber shown in FIG. 3A.

FIG. 4 is a refractive index profile of the core and the first cladding in the structure of the optical fiber subjected to the simulation.

For simplicity of calculation, the core and the first cladding are configured so that the core having a radius "a" has a refractive index $n_1$, the first cladding formed so as to surround the core has a refractive index $n_2$, and the refractive index profile is of a step index type such that the refractive index at the interface between the core and the first cladding is steeply changed.

In the above structure, the V factor referred to as a normalized frequency, $\Delta$, NA (numerical aperture), and k are given by Eqs. (1) to (4) shown below. That is, the V factor is uniquely determined by the core radius a, the wavelength $\lambda$, and the refractive indices $n_1$, and $n_2$.

The concentration of $Nd^{3+}$ in the core is 0.01 to 0.1 atomic % ($1\times10^{25}/m^3$), and the concentration of $Pr^{3+}$ in the first cladding is 15 wt %.

$$V = kn_1 a\sqrt{2\Delta} \quad (1)$$

$$\Delta = \frac{n_1^2 - n_2^2}{2n_1^2} \quad (2)$$

$$NA = \sqrt{n_1^2 - n_2^2} \quad (3)$$

$$k = \frac{2\pi}{\lambda} \quad (4)$$

Now, the proportion $\eta$ of propagation of light in the first cladding will be examined. The proportion of propagation of light in the core corresponds to $(1-\eta)$. The proportion $\eta$ is obtained by simulation as a function of the V factor.

Figure 5:
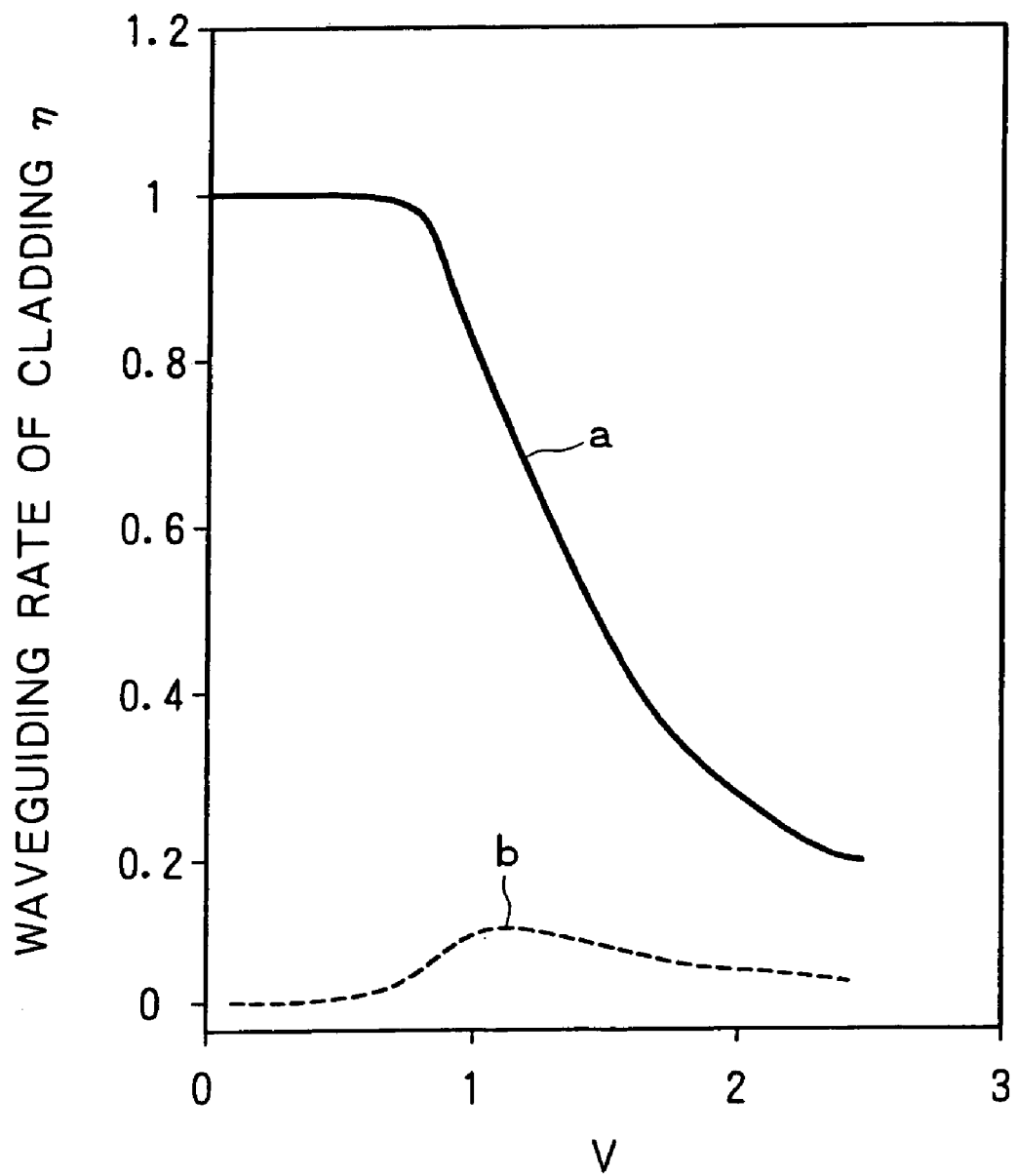
FIG. 5 is a graph showing the proportion $\eta$ of propagation in the first cladding and the difference $\Delta\eta$ obtained by subtracting a value for $\eta$ in the 920 nm band from a value for $\eta$ in the 1050 nm band, with respect to the V factor of the optical fiber.

Referring to FIG. 5, the solid line "a" shows a plot of $\eta$ to V, and the broken line "b" shows a difference ($\Delta\eta$) obtained by subtracting a value for $\eta$ in the case of the 920 nm band from a value for $\eta$ in the case of the 1050 nm band. The difference $\Delta\eta$ has positive values in the range of about 0.5 to about 2.5 for V, and becomes maximum ($\Delta\eta=0.12$) at a value of about 1.2 for V.

Accordingly, when the light in the 920 nm band propagates in the core by 34% and in the first cladding by 66%, the light in the 1050 nm band propagates in the core by 26% and in the first cladding by 74% (=66%×(1+0.12)).

Figure 3C:
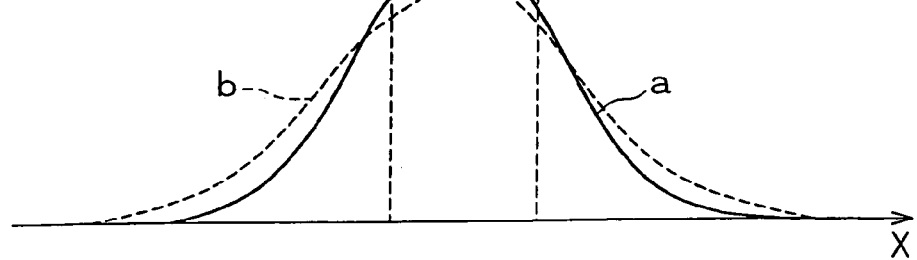
FIG. 3C is a schematic diagram showing the distribution of propagation of light in the wavelength band of 1050 nm and the distribution of propagation of light in the wavelength band of 920 nm in relation to FIG. 3B.

FIG. 3C is a schematic diagram of the distribution of the proportion of propagation of the light in each wavelength band as illustrated from the above result. In FIG. 3C, the solid line a corresponds to the 920 nm band, and the broken line b corresponds to the 1050 nm band.

The horizontal axis in FIG. 3C represents a position in the cross section of the optical fiber with the same scale as that in FIG. 3B, and the dotted lines in FIG. 3C show portions corresponding to the interface between the core 10 and the first cladding 11. The area surrounded by the curve of each distribution and the horizontal axis is normalized by the distributions shown by the solid line a and the broken line b.

As apparent from FIG. 3C, the proportion of propagation of the light in the 1050 nm band (the broken line b) is greater than the proportion of the light in the 920 nm band (the solid line a) as similar to the result mentioned above.

There will now be examined the difference (net gain) between gain and loss of the light in the 1050 nm band and the difference (net gain) between gain and loss of the light in the 920 nm band.

The difference (net gain) between gain and loss of the light in the first wavelength band (1050 nm band) satisfies Eq. (5) shown below to suppress the oscillation in the first wavelength band (1050 nm band), and the difference (net gain) between gain and loss of the light in the second wavelength band (920 nm band) satisfies Eq. (6) shown below to obtain the gain in the second wavelength band (920 nm band), thereby generating the laser oscillation.

$$\gamma_1 LP_{in}(1-\eta_1) - \alpha_1 LP_{in}\eta_1 \leq 0 \quad (5)$$

$$\gamma_2 LP_{in}(1-\eta_2) - \alpha_2 LP_{in}\eta_2 > 0 \quad (6)$$

In each of Eqs. (5) and (6), the first term on the left side means the gain, and the second term on the left side means the loss.

$\gamma_1$ and $\gamma_2$ are the gain coefficients in the 1050 nm band and the 920 nm band, respectively, wherein each gain coefficient is represented by the product of the stimulated emission scattering cross section and the concentration of $Nd^{3+}$ in the core. L is the length of the optical fiber. $P_{in}$ is the intensity of incident pump light. $\eta_1$ and $\eta_2$ are the proportions of propagation of the light in the first cladding in the 1050 nm band and in the 920 nm band, respectively. $\alpha_1$, and $\alpha_2$ are the absorption coefficients in the first cladding in the 1050 nm band and in the 920 nm band, respectively, wherein each absorption coefficient is estimated from absorption spectrum data of the glass doped with metal ions such as $Pr^{3+}$.

Figure 6:
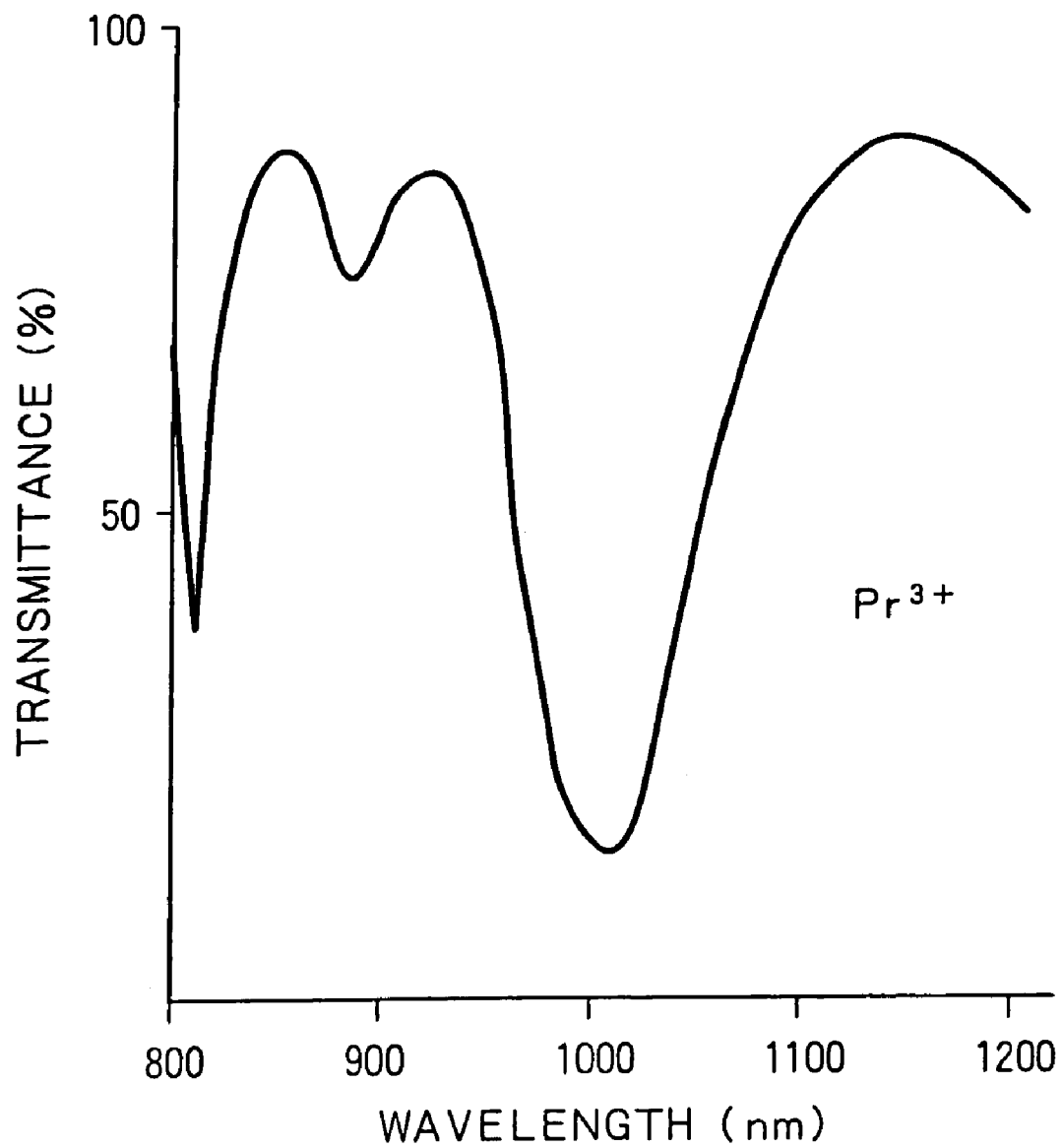
FIG. 6 is a graph of absorption spectrum data of $Pr^{3+}$-doped glass.

FIG. 6 shows absorption spectrum data of the glass doped with about 30 wt % of $Pr^{3+}$. In FIG. 6, the vertical axis represents transmittance, and the horizontal axis represents wavelength.

It is estimated from the data shown in FIG. 6 that in the glass doped with 15 wt % of $Pr^{3+}$ the absorption coefficient $\alpha_1$ is 15/m and the absorption coefficient $\alpha_2$ is 1.5/m.

The gain coefficient $\gamma_1$ in the 1050 nm band becomes the stimulated emission scattering cross section ($4\times10^{-24}$ $m^2$)×the concentration ($1\times10^{25}/m^3$)=40/m, and the gain coefficient $\gamma_2$ in the 920 nm band becomes the stimulated emission scattering cross section ($0.53\times10^{-24}$ $m^2$)× the concentration ($1\times10^{25}/m^3$)=5.3/m. While the above values for the stimulated emission scattering cross section are typical values, there is a slight difference in value for the scattering cross section according to core material.

Further, from the above calculation, the proportion $\eta_1$, of propagation of the light in the 1050 nm band in the first cladding becomes 0.74, and the proportion $\eta_2$ of propagation of the light in the 920 nm band becomes 0.66.

The above values in the 1050 nm band are inserted into Eq. (5) to give $$[40(/m)\times(1-0.74)-15(/m)\times 0.74]LP_{in} = -0.7LP_{in} < 0.$$

This result shows that the loss of the second term is greater than the gain of the first term, thereby suppressing the oscillation in the first wavelength band (1050 nm band).

Further, the above values in the 920 nm band are inserted into Eq. (6) to give $$[5.3(/m)\times(1-0.66)-1.5\,(/m)\times 0.66]LP_{in} = 0.812LP_{in} > 0.$$

This result shows that the gain of the first term is greater than the loss of the second term, thereby obtaining the gain in the second wavelength band (920 nm band) and effecting the laser oscillation and amplification.

Finally, a threshold on the pump light for effecting the laser oscillation and amplification in the 920 nm band will now be calculated.

A threshold $I_{th}$ on the pump light for effecting the laser oscillation and amplification is given by Eq. (7) shown below.

$$I_{th} = \frac{h\nu_p}{\sigma_p \tau_2} \quad (7)$$

where h is the Planck constant, $\nu_p$ is the frequency of the pump light, $\sigma_p$ is the absorption scattering cross section at the wavelength of the pump light, and $\tau_2$ is the fluorescence lifetime.

By inserting values for these symbols into Eq. (7), $I_{th}$=233 kW/cm². Further, a threshold $P_{th}$ for an effective area $A_{eff}$ (=5×10⁻¹² m²) of the optical fiber becomes 12 mW. Accordingly, by introducing the pump light having a power of 12 mW or more into the optical fiber, the laser oscillation and amplification in the 920 nm band can be effected.

In the above preferred embodiment, the optical fiber with the first cladding doped with $Pr^{3+}$ is used, and the configuration of the optical fiber containing $Pr^{3+}$ is set so that the oscillation in the first wavelength band (1050 nm band) is suppressed and the gain in the second wavelength band (920 nm band) is obtained to satisfy the conditions for laser oscillation and amplification. Further, the threshold on the pump light for effecting the laser oscillation and amplification is calculated. Alternatively, $Sm^{2+}$ (e.g., a concentration of about 1 wt %) may be used in place of $Pr^{3+}$ to configure an optical fiber. Also in this case, a similar calculation may be made. That is, the configuration of the optical fiber containing $Sm^{2+}$ may be set so that the oscillation in the first wavelength band (1050 nm band) is suppressed and the gain in the second wavelength band (920 nm band) is obtained to satisfy the conditions for laser oscillation and amplification. Further, a threshold for effecting the laser oscillation and amplification may be similarly calculated.

Figure 7:
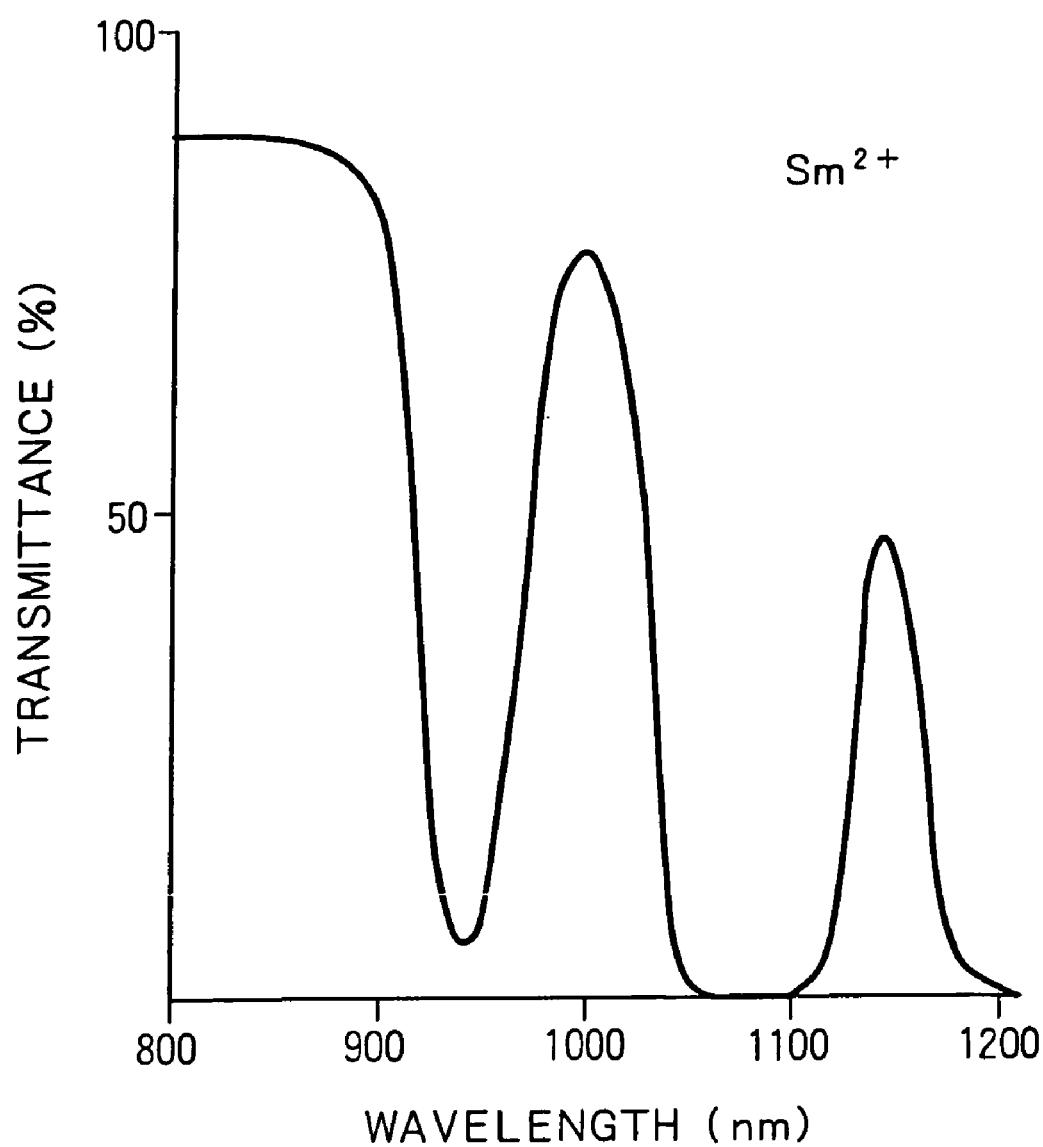
FIG. 7 is a graph of absorption spectrum data of $Sm^{2+}$-doped glass.

FIG. 7 shows absorption spectrum data of the glass doped with about 30 wt % of $Sm^{2+}$. In FIG. 7, the vertical axis represents transmittance, and the horizontal axis represents wavelength. From the data shown in FIG. 7, the absorption coefficients $\alpha_1$, and $\alpha_2$ of the glass doped with about 1 wt % of $Sm^{2+}$ in the 1050 nm band and in the 920 nm band can be estimated and incorporated into the above calculation.

Second Preferred Embodiment

Figure 8:
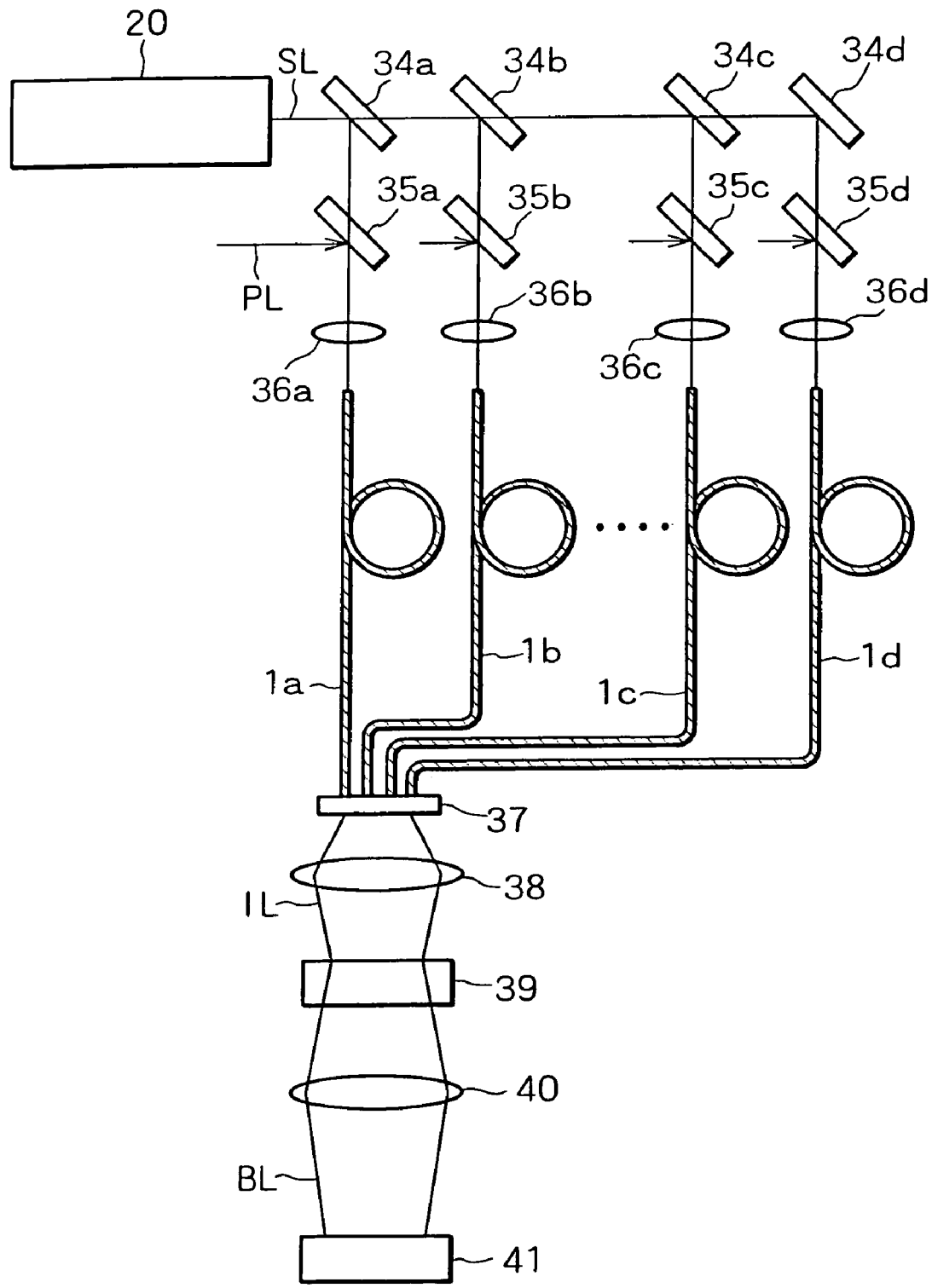
FIG. 8 is a schematic diagram of a laser light generating device according to a second preferred embodiment of the present invention.

FIG. 8 is a schematic diagram showing the configuration of a laser light generating device for preparing high-output infrared laser light having a 920 nm band and converting the infrared laser light into a second harmonic by a nonlinear element to generate blue laser light having a 460 nm band as similar to the first preferred embodiment.

If the output of the infrared laser light having a 920 nm band is too high in a single optical fiber, there is a possibility of damage to the optical fiber. To cope with this problem, a plurality of (e.g., four as shown) optical fibers 1a, 1b, 1c, and 1d are used to distribute the infrared laser light into a plurality of light components, which are in turn multiplexed and converted into a second harmonic by a nonlinear element, thereby generating blue laser light having a 460 nm band.

Each optical fiber used in this preferred embodiment is similar to the optical fiber 1 used in the first preferred embodiment.

In relation to the optical fibers 1a, 1b, 1c, and 1d, there are arranged at predetermined positions a master laser source 20, demultiplexer mirrors 34a, 34b, 34c, and 34d, multiplexer mirrors 35a, 35b, 35c, and 35d, condenser lenses 36a, 36b, 36c, and 36d, a multiplexer element 37, a condenser lens 38, a nonlinear element 39 for second-harmonic generation, a condenser lens 40, and an emerging element 41.

Signal laser light SL having a wavelength of 920±10 nm as light to be amplified and pump light PL having an 810 nm band and a wavelength band of 845±10 nm or 775±10 nm are coupled into each of the optical fibers 1a to 1d, in which the oscillation in the first wavelength band (1050 nm band) is suppressed and the gain in the second wavelength band (920 nm band) is obtained to effect the laser oscillation and amplification in the 920 nm band as in the first preferred embodiment.

The infrared laser light components in the 920 nm band output from the optical fibers 1a to 1d are multiplexed by the multiplexer element 37 to obtain high-intensity infrared laser light IL. The infrared laser light IL (920 nm band) is next converted into a second harmonic (460 nm band) by the nonlinear element 39 to generate blue laser light BL, which is emerged from the emerging element 41.

In the laser light generating device according to this preferred embodiment as similar to the first preferred embodiment, the oscillation in the first wavelength band (1050 nm band) is suppressed and the gain in the second wavelength band (920 nm band) is obtained to obtain high-intensity laser oscillation in the 920 nm band. Then, the high-intensity laser light in the 920 nm band is converted into the second harmonic by the nonlinear element to generate the blue laser light in the 460 nm band.

Third Preferred Embodiment

This preferred embodiment is a color laser display unit.

Figure 9:
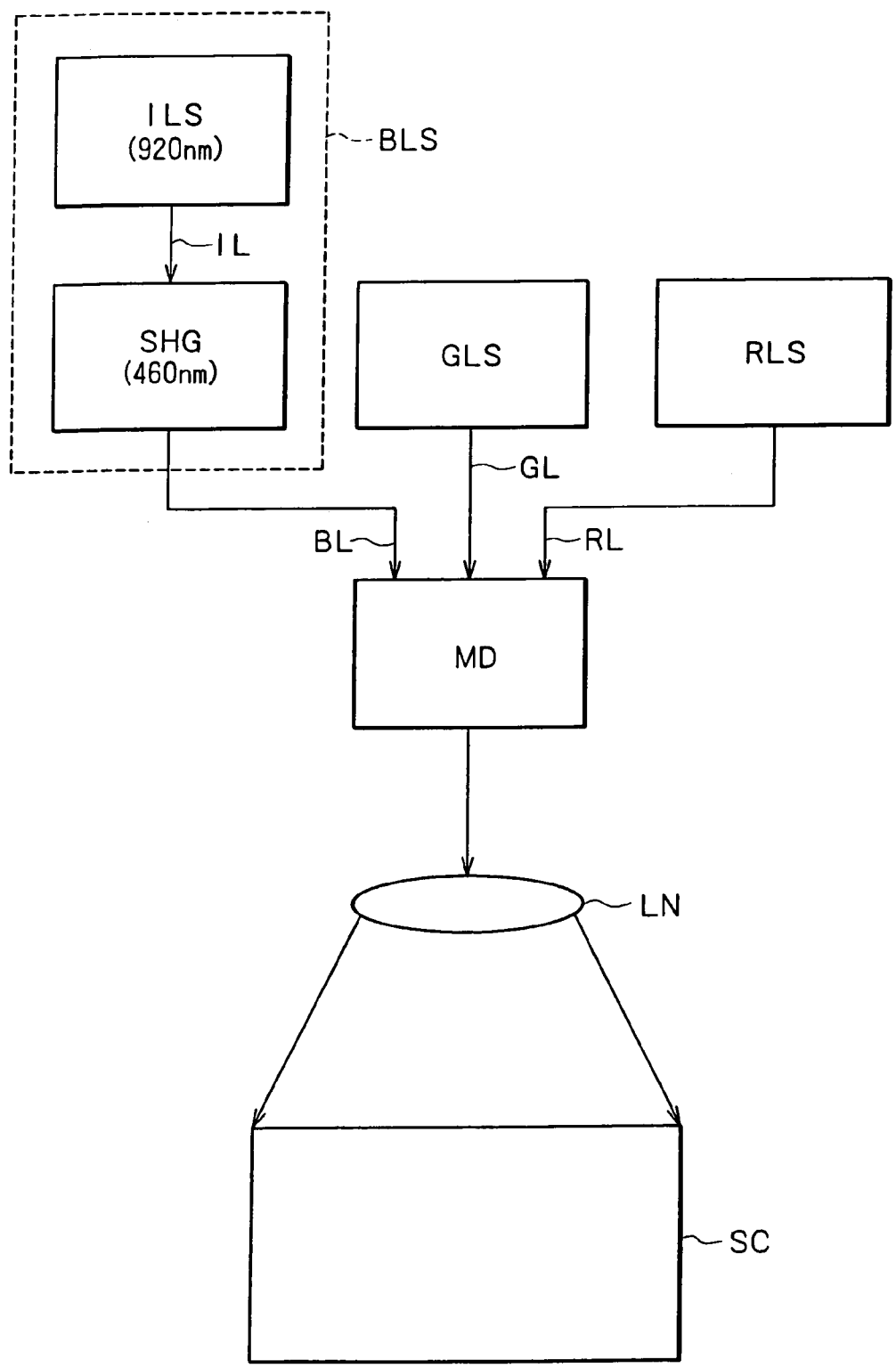
FIG. 9 is a schematic diagram of a color laser display unit according to a third preferred embodiment of the present invention.

FIG. 9 is a schematic diagram showing a color laser display unit using the laser light generating device according to the first or second preferred embodiment as a blue laser light generating device BLS.

The color laser display unit according to this preferred embodiment has a green laser light generating device GLS and a red laser light generating device RLS in addition to the blue laser light generating device BLS as light sources.

The color laser display unit further has a spatial modulator MD such as a galvanometer mirror, GLV (grating light valve), and AOM, a projection lens LN, and a screen SC.

Blue laser light BL, green laser light GL, and red laser light RL respectively emitted from the light sources BLS, GLS, and RLS are spatially modulated by the spatial modulator MD and projected onto the screen SC by the projection lens LN to form a color image.

The blue laser light generating device BLS has a configuration similar to that of the laser light generating device according to the first or second preferred embodiment.

More specifically, the blue laser light generating device BLS has an infrared laser generating device ILS for generating infrared laser light IL having a 920 nm band and a nonlinear element SHG for converting the infrared laser light IL (920 nm band) into a second harmonic (460 nm band). That is, the infrared laser generating device ILS corresponds to a part of the laser light generating device according to the first or second preferred embodiment on the upstream side of the nonlinear element 31 or 39.

The infrared laser light IL in the 920 nm band emitted from the infrared laser generating device ILS is converted into the second harmonic (460 nm band) by the nonlinear element SHG to generate the blue laser light BL.

Thus, the color laser display unit according to this preferred embodiment includes as the blue laser source the laser light generating device according to the first or second preferred embodiment having the configuration that the oscillation in the first wavelength band (1050 nm band) is suppressed and the gain in the second wavelength band (920 nm band) is obtained to obtain high-intensity laser oscillation in the 920 nm band and that the laser light in the 920 nm band is converted into the second harmonic by the nonlinear element to generate the blue laser light in the 460 nm band. Then, the blue laser light is projected onto the screen together with the green laser light and the red laser light obtained by other means (GLS and RLS, respectively).

The present invention is not limited to the above preferred embodiments.

For example, the first cladding is doped with rare earth ions such as $Pr^{3+}$ or $Sm^{2+}$ in relation to the $^4F_{3/2} \rightarrow {}^4I_{11/2}$ transition (1050 nm band) and the $^4F_{3/2} \rightarrow I_{9/2}$ transition (920 nm band) as the transitions of an energy state of $Nd^{3+}$ contained in the glass forming the core in each preferred embodiment mentioned above. Alternatively, in the case that there are a plurality of transition wavelength bands each allowing the oscillation of light, the cladding of the optical fiber according to the present invention may be doped with metal ions selected so that the absorption coefficient in one of the transition wavelength bands is greater than the absorption coefficient in another transition wavelength band. With this configuration, the oscillation in the one transition wavelength band can be suppressed, and the oscillation and amplification in the other transition wavelength band can be effected. Further, the present invention may adopt any other transitions between energy states and any other metal ions.

Other various modifications may be made without departing from the scope of the present invention.

What is claimed is:

1. A color laser display unit comprising:
   a blue laser light generating device;
   a green laser light generating device;
   a red laser light generating device;
   a spatial modulator for spatially modulating blue laser light generated from said blue laser generating device, green laser light generated from said green laser light generating device, and red laser light generated from said red laser light generating device;
   a lens for projecting said blue laser light, said green laser light, and said red laser light spatially modulated by said spatial modulator; and
   a screen for receiving said blue laser light, said green laser light, and said red laser light projected by said lens to form a color image;
   said blue laser light generating device comprising: an optical fiber having a core doped with first metal ions, and a cladding formed so as to surround said core and doped with second metal ions selected so that the absorption coefficient in a transition wavelength band of first transition of said first metal ions is greater than the absorption coefficient in a transition wavelength band of second transition of said first metal ions;
   a first light source for emitting light to be amplified in said transition wavelength band of said second transition;
   a second light source for emitting pump light; a nonlinear element for converting incident light into a second harmonic; and
   optical means for coupling said light to be amplified and said pump light into said optical fiber and coupling emergent light from said optical fiber into said nonlinear element;
   the amplification of light due to said first transition being suppressed in said optical fiber;
   the amplification of said light to be amplified or the oscillation of light due to said second transition being effected in said optical fiber;
   said emergent light from said optical fiber being converted into second-harmonic laser light by said nonlinear element, wherein the wavelength of said second-harmonic laser light comprises 460±10 nm.

* * * * *